United States Patent [19]

Hanna

[11] 4,404,752
[45] Sep. 20, 1983

[54] CLIP-ON COMPASS

[76] Inventor: John W. Hanna, 4076 Crown Point Dr., San Diego, Calif. 92109

[21] Appl. No.: 270,083

[22] Filed: Jun. 3, 1981

[51] Int. Cl.³ .............................................. G01C 17/04
[52] U.S. Cl. ................................... 33/347; 33/355 R; 33/1 SD
[58] Field of Search ...................... 33/347, 354, 355 R, 33/272, 1 SD, 274, 333, 342, 352, 273, 339; 224/269, 252, 277; 24/3 J, 3 L, 3 R, 248 R, 250, 252 R, 259.9

[56] References Cited

U.S. PATENT DOCUMENTS

| | | | |
|---|---|---|---|
| 742,472 | 10/1903 | Mosses | 33/354 X |
| 1,304,789 | 5/1919 | Marion | 33/355 X |
| 1,680,998 | 8/1928 | Krantz | 224/277 X |
| 2,487,044 | 11/1949 | Cude | 33/354 X |
| 2,603,896 | 7/1952 | Bennett | 224/277 X |

FOREIGN PATENT DOCUMENTS

| | | | |
|---|---|---|---|
| 347222 | 12/1904 | France | 33/272 |
| 104824 | 6/1942 | Sweden | 33/1 SD |

Primary Examiner—William D. Martin, Jr.
Attorney, Agent, or Firm—Ralph S. Branscomb

[57] ABSTRACT

The invention is in the field of compass course following and comprises a means and method of mounting a compass directly on a map with a North-South reference line and following a course on the map directly once the compass needle is aligned with North. In all references to the direction "North" throughout this document *magnetic* North only shall apply.

1 Claim, 7 Drawing Figures

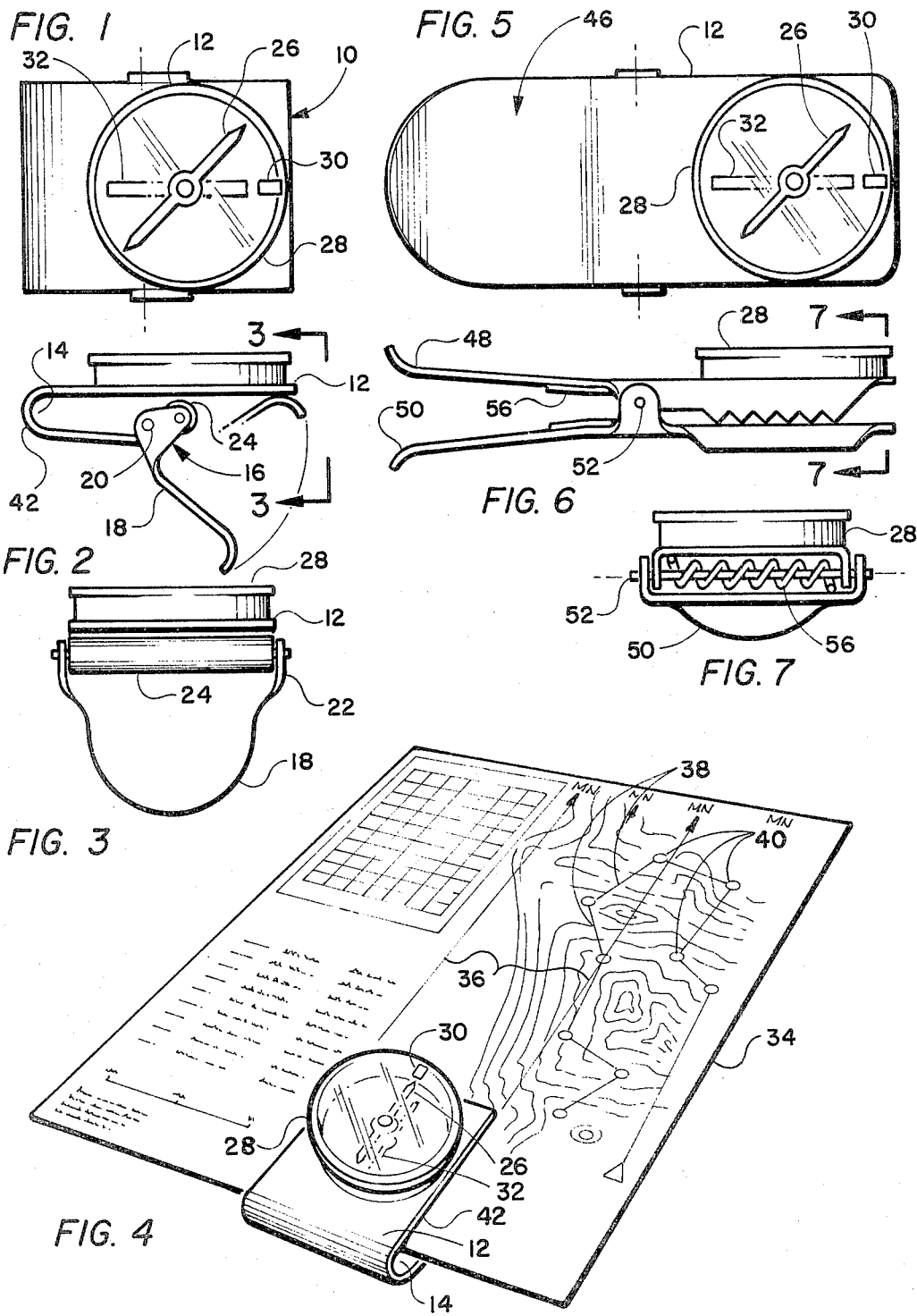

CLIP-ON COMPASS

BACKGROUND OF THE INVENTION

In a litte known sport called "orienteering", contestants are provided with a compass and a map marked with a course, the map also having North-South reference lines. The maps have a course laid out in segments touching on a number of "control" points at which there is a stamp which must be stamped on their map when they get to that point to prove they have been there. Also on the map are topographical markings and symbols indicating the terrain, whether it is wooded or barren, where streams and marshes are, etc.

Therefore, the orienteer must carefully analyze the map quickly before he leaves each point to get to the next to identify what appears on the map to be the easiest course. The most direct line almost certainly is not the easiest course, and might involve stumbling through brush and over rocky outcroppings which could have been avoided by following a contour line which essentially connects the two points.

Although not as popular in the United States as in other places, orienteering is extremely popular in Scandinavia and has produced participants who have followed these courses since early childhood and who are extremely capable.

The technique generally used currently by orienteers requires a compass which has an overlying rotatively adjustable direction line. The compass is put on the map with North to North, and the direction line is adjusted rotatively to align with the direction of the first segment of the multi-segmented course. The orienteer, after figuring roughly how he intends to follow the course, springs off onto the course, checking his direction occasionally by aligning his compass with North and looking at the direction line he has set for that particular segment of the course.

Once he reaches his control point, he does the same thing with the next segment, that is, puts his compass on the map with the North on the compass aligned with the map's North (this, of course, is independant of the direction the needle of the compass is pointing), and rotates the direction indicator on his compass parallel with the direction of the next segment of the course. Once again he springs off, checking his direction time to time by aligning the compass needle with magnetic North by the compass needle and glancing at his directional line on the compass, to see if his path approximates, or deviates from the requisite course indicated by the direction line on the map.

This requires two pieces of equipment, the compass and the map. When it is raining and when it is very cold, it sometimes becomes difficult to change the direction line on the compass, since this usually requires barehanded operation. Also, having two objects to carry through underbrush and trees increases the chances of losing one and reduces one's manuverability slightly.

It would, therefore, be desireable to eliminate one of these items.

SUMMARY OF THE INVENTION

The present invention in effect does this by combining the compass with the map by virtue of an ingenious clip-on compass. The compass need only have a single indicator marking North, and a reference line which runs North and South which can be aligned with a North/South line on the map. When the compass is clipped onto the map in the above described manner by rotating the map with the compass on it until the compass needle points to the North indicator on the compass cover, the actual direction of the marking of each segment on the map represents the true direction to follow.

The map can be enclosed in a plastic overlay for rainy conditions, which occur quite often in areas where orinteering is popular. These covers are used currently for the maps, but of course the compass must be kept outside so it can be relocated when required.

By the incorporation of a special clamp which is easy to manipulate with mittens on or with wet hands, and the simplification of the compass and broadening of the compass markings, which comprise a single North indicator and a broad alignment strip for ease of orientation, the compass and clip are designed to be ideally suitable for orienteering and other course-following adventures.

BRIEF DESCRIPTION OF THE DRAWINGS

FIG. 1 is a top elevation view of the compass;

FIG. 2 is a side elevation view of the compass;

FIG. 3 is an end elevation view of the compass;

FIG. 4 is a perspective illustrating the compass is used on a map;

FIG. 5 is a top elevation view of a modification of the compass of FIGS. 1 through 4;

FIG. 6 is a side elevation view of the compass of FIG. 5; and

FIG. 7 is an end elevation view taken along line 7—7 of FIG. 6.

DETAILED DESCRIPTION OF THE PREFERRED EMBODIMENTS

In its preferred embodiment, the invention includes a frame 10 having an upper plate 12 with one end which extends back and is bent to return defining a bay 14 to receive the edge or the fold of a map.

At the end of the extended frame 10 and pivotally mounted thereto is a clamp 16 having a broad thumb lever 18 designed to be easily thumb-operated in cold conditions when wearing mittens. A pin 20 anchors the clamp, and at the end of a pair of side plates 22 a roller 24 is journalled. The roller preferably is knurled or otherwise provided with a frictional surface to help prevent lateral skidding of the compass across a map.

As can be seen in phantom in FIG. 2, when the thumb lever 18 is pressed against the underside of the plate 12, an over-the-center action is achieved when the roller 24 is cammed under. The roller thus provides easy sliding across the face of a map, while the over-the-center action provides a positive gripping to achieve the best of both worlds and facilitate opening and closing of the device by a gloved user.

Mounted on top of the plate 12 is a pivoted compass needle 26, and covering the compass needle is a transparent cover 28 having a North indicator at 30 on the top face thereof. Ideally, on the top of the plate 12 is also a North/South oriented broad stripe 32 to quickly permit the user to align the needle to North orientation when viewing the compass at any angle to the viewer's eye.

Although the device has other uses, as indicated above one of its principal uses is in the sport of orienteering. In this sport, a map such as map 34 is used wherein parallel North/South reference lines 36 are clearly defined. The map is a topographical map, and also has a legend with indications of the type of terrain, and where obstacles occur. Superimposed on top of the map itself is a course comprising a plurality of sequential segments 38 connecting control points 40.

To utilize the device, it is necessary that the frame 10 have same type of indicator line which is easily alignable with the North/South reference lines 36 of the map. In the instant embodiment, the two straight North/South reference lines on the map, of the plate 12 both align with the North/South direction of the assembly as indicated by the stripe 32. Either of these edges can be aligned with one of the North/South reference lines on the map, and when this is done, the map is in effect turned into a compass. By rotating the map until the needle 26 points to North according to the compass, the map is also oriented to the North. The orienteer is then able to simply head himself in the direction of any one of the segments 38 as he arrives at the prior checkpoint 40, and as long as the needle 26 is at the North indicator 30, he is heading in the correct direction.

Over the entire orienteering course, it will become necessary, or at least desirable, to move the compass closer to the precise route segment 38 which the orienteer is following at the moment. Clearly East-West adjustments can be made by sliding the compass clip laterally, and North-South adjustments can equally easily be made by forming a fold in the map and engaging the fold in the bay 14 inside the clamp. The compass can be removed and new folds made as North-South positions change.

In addition to reducing, in effect, the number of pieces of equipment used in orienteering from two to one, it also enables the orienteer to have before him at once both the topography of the terrain as illustrated on the map, which he can directly compare to that around him, and also see his path through the terrain as indicated by the direction of the segment 38.

A slightly different version of the invention is shown in FIGS. 5 through 7. In this embodiment, rather than utilizing the over-the-center clamp action of the prior embodiment, an alligator clip 46 serves as both the clamp and the frame of the unit, defining the top plate on which the compass needle 26 and cover 28 are defined. The alligator clip is inexpensively defined by upper and lower members 48 and 50, pivoted at 52 and biased by spring 56. Utilization of this modification on the map in the same fashion as was the previous embodiment is obvious.

In either embodiment, by virtue of the easy to use clip design to accomodate mittened fingers, the tool is ideally adapted for use by mountaineers back packers, hunters, cross-country skiers or canoeists.

While I have described the preferred embodiment of the invention, other embodiments may be devised and different uses may be achieved without departing from the spirit and scope of the appended claims.

What is claimed is:
1. A clip-on compass assembly comprising:
(a) a non-ferromagnetic frame;
(b) a "North" indicator on said frame;
(c) a compass needle pivotally mounted to said frame and allignable with said indicator;
(d) a clamp mounted on said frame for clamping a map beneath said compass needle;
(e) said frame including a mounting plate with said needle mounted atop same and said frame also having a reference line-defining structure alignable with a reference line on a map engaged by said clamp;
(f) Said clamp comprising a cam-type over-the-center device with a roller which clamps against the bottom of said plate; and,
(g) said plate having an extended resilient end with a spaced return portion defining a deep bay to receive a map, with said clamp being pivoted to said end.

* * * * *